United States Patent [19]

Lamden

[11] 3,836,893

[45] Sept. 17, 1974

[54] CAPACITIVE COMPUTER CIRCUITS

[75] Inventor: Ralph James Lamden, Reading, England

[73] Assignee: Ultra Electronics Limited, Marlow, Buckingham, England

[22] Filed: Feb. 22, 1973

[21] Appl. No.: 334,766

[30] Foreign Application Priority Data

Feb. 25, 1972 Great Britain ...................... 8732/72

[52] U.S. Cl. .................... 340/173 CA, 340/173 R, 340/173 DR, 320/1

[51] Int. Cl. ....................... G11c 11/40, G11c 11/24

[58] Field of Search... 340/173 R, 173 CA, 173 DR; 320/1

[56] References Cited

UNITED STATES PATENTS

| | | | |
|---|---|---|---|
| 2,985,838 | 5/1961 | Cole | 340/173 DR |
| 3,387,286 | 6/1968 | Dennand | 340/173 DR |
| 3,506,851 | 4/1970 | Polkinghorn | 340/173 DR |
| 3,521,141 | 7/1970 | Walton | 320/1 |

*Primary Examiner*—Terrell W. Fears
*Attorney, Agent, or Firm*—Kemon, Palmer & Estabrook

[57] ABSTRACT

A capacitive computer circuit comprises a field effect switch connected to a storage capacitor, means for applying a signal characteristic to or deriving a signal characteristic from the capacitor, and means for compensating for errors in the derived signal due to leakage current or stray capacitance in the circuit.

7 Claims, 5 Drawing Figures

CAPACITIVE COMPUTER CIRCUITS

The present invention relates to improvements in capactive computer circuits.

Capactive circuits find application in analogue computers in which capactive circuits are utilised for input of information data in a write-in stage with subsequent read-out of the information when the information stored signal on the respective capacitor is applied to signal utilisation circuits.

According to the present invention there is provided a capacitive computer circuit comprising a field effect switch connected to a storage capacitor, means for applying a signal characteristic to or deriving a signal characteristic from the capacitor, and means for compensating for errors in the derived signal due to leakage current or stray capacitance in the circuit.

The capacitor may be in the form of a single capacitive component connected to a field effect switch device or may be in the form of a number of capacitive components connected to a field effect switch device.

The invention will now be described in more detail, by way of example only, with reference to the accompanying drawings, in which.

Figure 1:
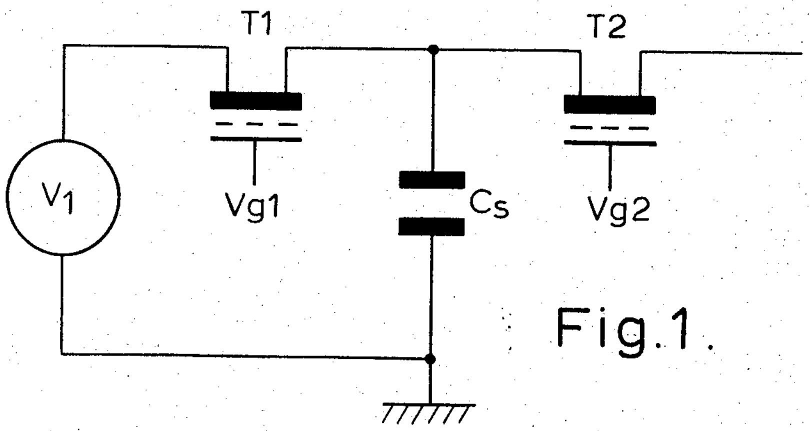
FIG. 1 shows a capacitive storage circuit for use in an analogue computer, not in accordance with the invention.

The storage circuit shown in FIG. 1 comprises two series connected field effect switches T1 and T2 having respective control electrodes Vg1 and Vg2. A capacitor $C_S$ is connected between a point intermediate the switches T1 and T2, and earth.

The storage circuit may be employed in an analogue computer, in which case the field effect switches may form part of a multiplexer arrays.

The capacitor $C_S$ stores a voltage $V_1$ applied to it by closing the field effect switch T1. The voltage stored by the capacitor $C_S$ may be read by closing the field effect switch T2. The circuit therefore provides write-in or read-out of information data in the analogue computer, as of a signal voltage characteristic $V_1$, by selecting the appropriate capacitor with the respective field effect switch.

Figure 2:
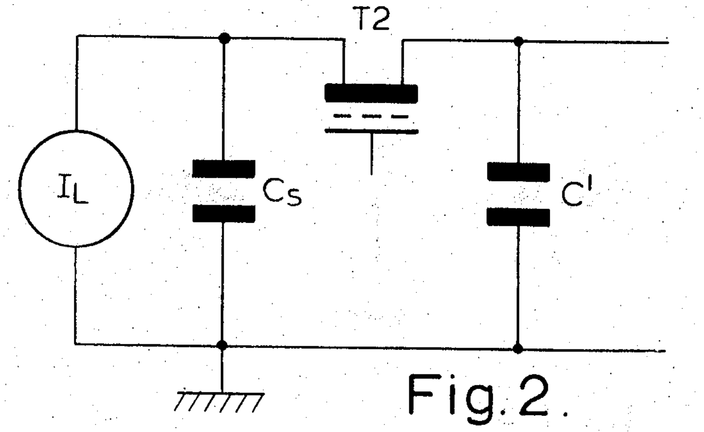
FIG. 2 shows a part of the storage circuit showing a leakage current and a stray capacitance, not in accordance with the invention.

Such analogue information data is subject to error as switching transients may cause small disturbances as the switches T1 and T2 are operated and this may be mitigated by employing insulated gate transistors. A degradation error may be due to leakage current. This is illustrated in FIG. 2 as having value $I_L$ and flowing through a part of the circuit to the left hand side of the capacitor $C_S$, when the switch is in the off condition. Stray capacitance is indicated to the right hand side of FIG. 2 as having a value $C^l$.

With a typical field effect multiplexer the current leakage is about 2nA at a temperature of 25°C and doubles for every 10°C rise in temperature. In addition to this there is added the input bias current of any buffer amplifiers connected permanently to the analogue computer store.

Figure 3:
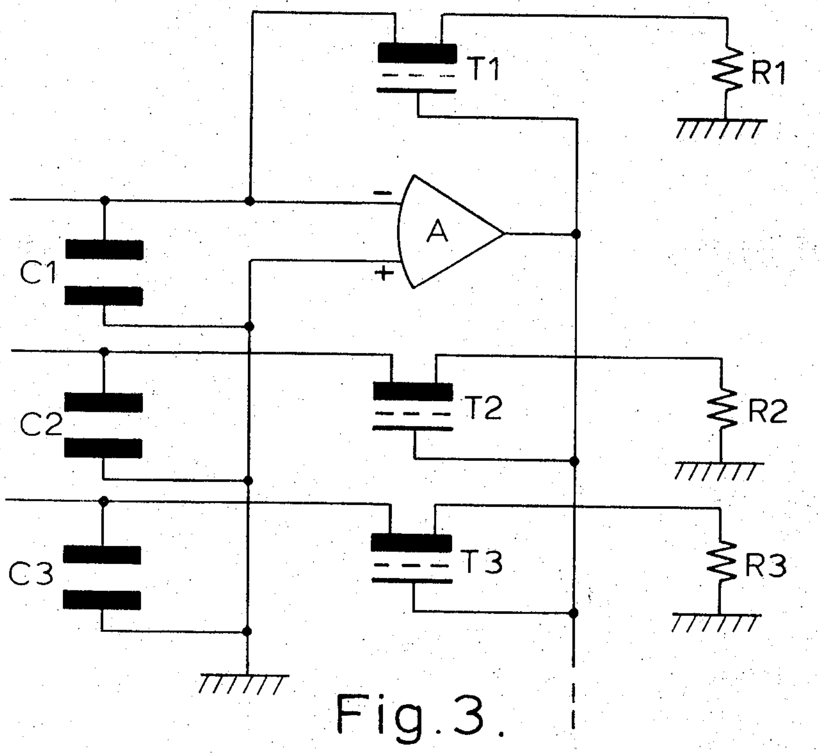
FIG. 3 shows a first form of capacitive storage circuit in accordance with the invention.

The circuit illustrated in FIG. 3 serves to help neutralise the leakage current which arises with the circuit shown in FIGS. 1 and 2.

The circuit shown in FIG. 3 has three storage capacitors $C^1$, $C^2$, $C^3$ each having one electrode connected to respective resistors R1, R2, R3 through respective field effect transistors T1, T2, T3. The resistors R1, R2, R3 are connected to earth.

The other electrode of each of the storage capacitors is connected to earth and to the non-inverting input of a voltage amplifier A whose output is connected to control electrodes of the field effect transistors T1, T2, T3.

The inverting input of the amplifier A is connected to one of the capacitors C1 which is a dummy capacitor and the transistor T1. The amplifier A may be connected to a switch which is dormant or to one which undergoes periodic switching in the same way as the storage switches.

In operation, the amplifier output voltage varies with any leakage currents or bias, and the feedback current through the high impedance consisting of the transistor T1 and Resistor R1 tends to compensate for the combined effects of the leakage current and bias.

The resistors R2 and R3 may be adjusted to compensate for the leakage currents from the capacitors connected to respective transistors T2 and T3. Such leakage currents may be matched to that from the capacitor connected to the transistor T1.

Figure 4:
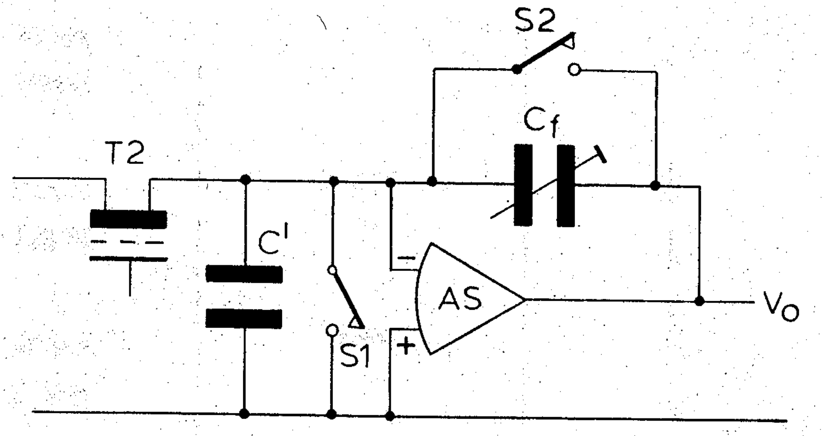
FIG. 4 shows a second form of capacitive storage circuit in accordance with the invention.

On read-out, further errors may arise owing to stray capacitance represented by $C^1$ in FIG. 2. This stray capacitance may be due to a buffer amplifier and an output busbar if these are provided. When the switch T2 in FIG. 2 is closed, there is share of the charges existing on $C_S$ and $C^1$ between them and if $C^1$ is not, prior to such closure of switch transistor T2, at the same voltage as $C_S$ there will occur a voltage error, which can be minimised by making $C_S$ as large as possible consistent with write-in time. The circuit arrangement illustrated in FIG. 4 provides an alternative mode of compensation for stray capacitance.

A voltage sensitive amplifier AS, has its non-inverting input connected to earth and its negative input connected to a field effect switch T2 and hence the stray capacitance $C^1$. Negative feedback is provided by a pre-set capacitor $C_f$. In this configuration amplifier AS transforms any charge switched to its inverting terminal via field offset switch T2 into a voltage output. The switch T2 may be shorted to earth via a switch S1 and the capacitor $C_f$ may be shorted via a switch S2. Switches S1 and S2 may be closed between readings to prevent the accumulation of leakage charges on the capacitors $C^1$ and $C_f$.

Charge build up is prevented from causing error by placing $C^1$ at virtual earth potential. Any build up of charge on the capacitor $C^1$ is inverted at the negative input of the amplifier, amplified, and fed-back via the capacitor $C_f$. The build up of charge is therefore cancelled out.

Figure 5:
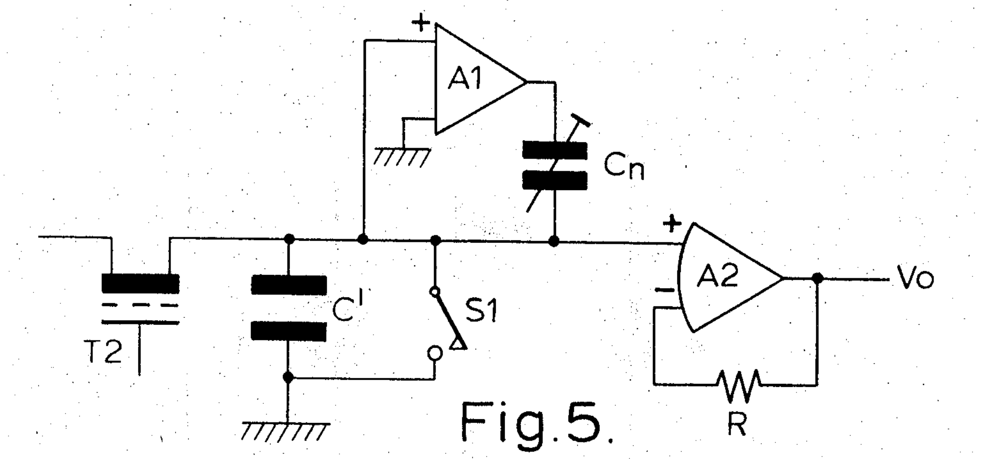
FIG. 5 shows a third form of a capacitive storage circuit in accordance with the invention.

The circuit shown in FIG. 5 comprises a field effect switch T2 shorted to earth via stray capacitance $C^1$ in series with a switch S1. The switch T2 is connected to the positive inputs of a fixed positive gain amplifier A1 and a buffer amplifier A2 provided with negative feedback by a resistor R. The output of the amplifier A1 is connected to the non-inverting input of the amplifier A2 through a pre-set capacitor $C_n$.

The circuit illustrated in FIG. 5 enables reactance due to stray capacitance to be cancelled by feedback of charge from the fixed positive gain amplifier A1 through the capacitor $C_n$. The switch S1 can be closed between readings; or a long time-constant feedback may be used to avoid the accumulation of charge. The amplifier A1 may be driven from the buffer amplifier A2. As the stray capacitance $C^1$ is often largely composed of the drain to substrate capacitances of a field effect multiplexer, i.e., is voltage dependent, it may be that $C_n$ in FIG. 5 should be varied for each value of voltage output. To provide for such a requirement, the amplifier A1 may be provided with a non-linear characteristic.

The storage capacitors may be provided with dielectrics with low hysteresis loss for recovery of all the stored charge.

To overcome the effects of stray capacitance there may be utilised a permanently connected buffer amplifier with each respective store, which step however may be considered uneconomic or unreliable. Further, driving the multiplexer substrate with the output may be utilised, this however having a defect due to the resitrcted range for the substrate voltage. Further, a circuit for compensation of leakage current may be combined with non-linear neutralisation.

I claim:

1. A capacitive computer circuit comprising: a first field effect switch and a storage capacitor connected thereto; means for applying a signal characteristic to or deriving a signal characteristic from said capacitor; a dummy storage capacitor; and amplifier having inverting and noninverting inputs connected across said dummy storage capacitor, said non-inverting input being also connected to earth; a further field effect switch; and input of said amplifier connected through said further field effect switch to the inverting input of said amplifier, thereby providing negative feedback to resist any change in the voltage of said dummy capacitor, said amplifier also controlling said first field effect switch to compensate for leakage in said storage capacitor.

2. The capacitive circuit of claim 1 in which said field effect switches are field effect transistors having their gate electrodes connected to said output of said amplifier, and in which a resistor is connected in series with the main current path of each field effect transistor for selecting the degree of compensation provided, each said resistor connecting each said capacitor to earth through said main current path of each said field effect transistor.

3. The capacitive computer circuit of claim 2, comprising further storage capacitors, each said storage capacitor having one electrode connected to earth and one electrode connected to earth through a respective field effect switch and a respective resistor, the control electrode of each said switch being connected to the output of said amplifier and each said transistor being selected to provide a predetermined degree of leakage compensation for each of said storage capacitors.

4. A capacitive computer circuit comprising: a field effect switch and a storage capacitor connected thereto; means for applying a signal characteristic to or deriving a signal characteristic from said capacitor; a voltage amplifier having an inverting input connected to said field effect switch; and a preset capacitor connected between the output and input of said voltage amplifier so as to resist any charge build-up in the stray capacitance in said circuit, the stray capacitance thereby being compensated.

5. The capacitive computer circuit of claim 4, comprising switches connected to short circuit the stray capacitance and the feedback capacitor between each reading.

6. A capacitive computer circuit comprising: a first field effect switch and a storage capacitor connected thereto; means for applying a signal characteristic to or deriving a signal characteristic from said capacitor; means for compensating for stray capacitance in said circuit, said means including a fixed positive gain voltage amplifier having its input directly connected to said switch, and a preset capacitance connecting the output of said fixed gain voltage amplifier to said switch.

7. The circuit of claim 6 in which said fixed positive gain amplifier is non-linear to compensate for a voltage dependent stray capacitance.

* * * * *